(12) United States Patent
Fischer et al.

(10) Patent No.: US 10,802,619 B2
(45) Date of Patent: Oct. 13, 2020

(54) OPERATING ELEMENT FOR AN ELECTRICALLY CONTROLLED MACHINE

(71) Applicant: KEBA AG, Linz (AT)

(72) Inventors: Harald Fischer, Ebenau (AT); Benjamin Hackl, Linz (AT); Wolfgang Mahr, Steyregg (AT)

(73) Assignee: KEBA AG, Linz (AT)

( * ) Notice: Subject to any disclaimer, the term of this patent is extended or adjusted under 35 U.S.C. 154(b) by 28 days.

(21) Appl. No.: 16/461,959

(22) PCT Filed: Nov. 22, 2017

(86) PCT No.: PCT/AT2017/060311
§ 371 (c)(1),
(2) Date: May 17, 2019

(87) PCT Pub. No.: WO2018/094437
PCT Pub. Date: May 31, 2018

(65) Prior Publication Data
US 2020/0272246 A1    Aug. 27, 2020

(30) Foreign Application Priority Data

Nov. 23, 2016 (AT) ............................. A 51063/2016
Aug. 31, 2017 (AT) ............................. A 50732/2017

(51) Int. Cl.
*G06F 3/0362* (2013.01)
*G05G 1/08* (2006.01)
(Continued)

(52) U.S. Cl.
CPC ............. *G06F 3/0362* (2013.01); *G05G 1/08* (2013.01); *G05G 1/10* (2013.01); *H01H 3/08* (2013.01)

(58) Field of Classification Search
CPC ...... G06F 3/0362; G06F 3/016; G06F 3/0338; G05G 1/08; G05G 1/10; H01H 19/025;
(Continued)

(56) References Cited

U.S. PATENT DOCUMENTS

| 5,436,413 A | 7/1995 | Katakami |
| 7,623,934 B2 | 11/2009 | Iefuji et al. |

(Continued)

FOREIGN PATENT DOCUMENTS

| AT | 512 521 B1 | 9/2013 |
| DE | 199 36 257 A1 | 2/2001 |

(Continued)

OTHER PUBLICATIONS

International Search Report in PCT/AT2017/060311, dated Mar. 5, 2018.

(Continued)

*Primary Examiner* — Xuemei Zheng
(74) *Attorney, Agent, or Firm* — Collard & Roe, P.C.

(57) ABSTRACT

The invention relates to an operating element (4) for an electrically controlled machine (2), having an operating element body (7) and a rotating wheel (10) for inputting a command into a controller (3) of the machine (2), wherein the rotating wheel (10) is arranged on the operating element body (7) in a rotatable manner about a rotational axis (12) and is surrounded by a lateral surface (11) that has local diameter mean value (13) specified in the perpendicular direction to the rotational axis (12), on which lateral surface (11) the rotating wheel (10) may be gripped and rotated by a machine operator (5), wherein the lateral surface (11) of the rotating wheel (10) has at least two actuation portions (14, 15) with different surface structures (17), wherein a sensor region (18, 19) of a sensor element (21, 22) is associated with at least one of the actuation portions (14, (Continued)

Figure 10:
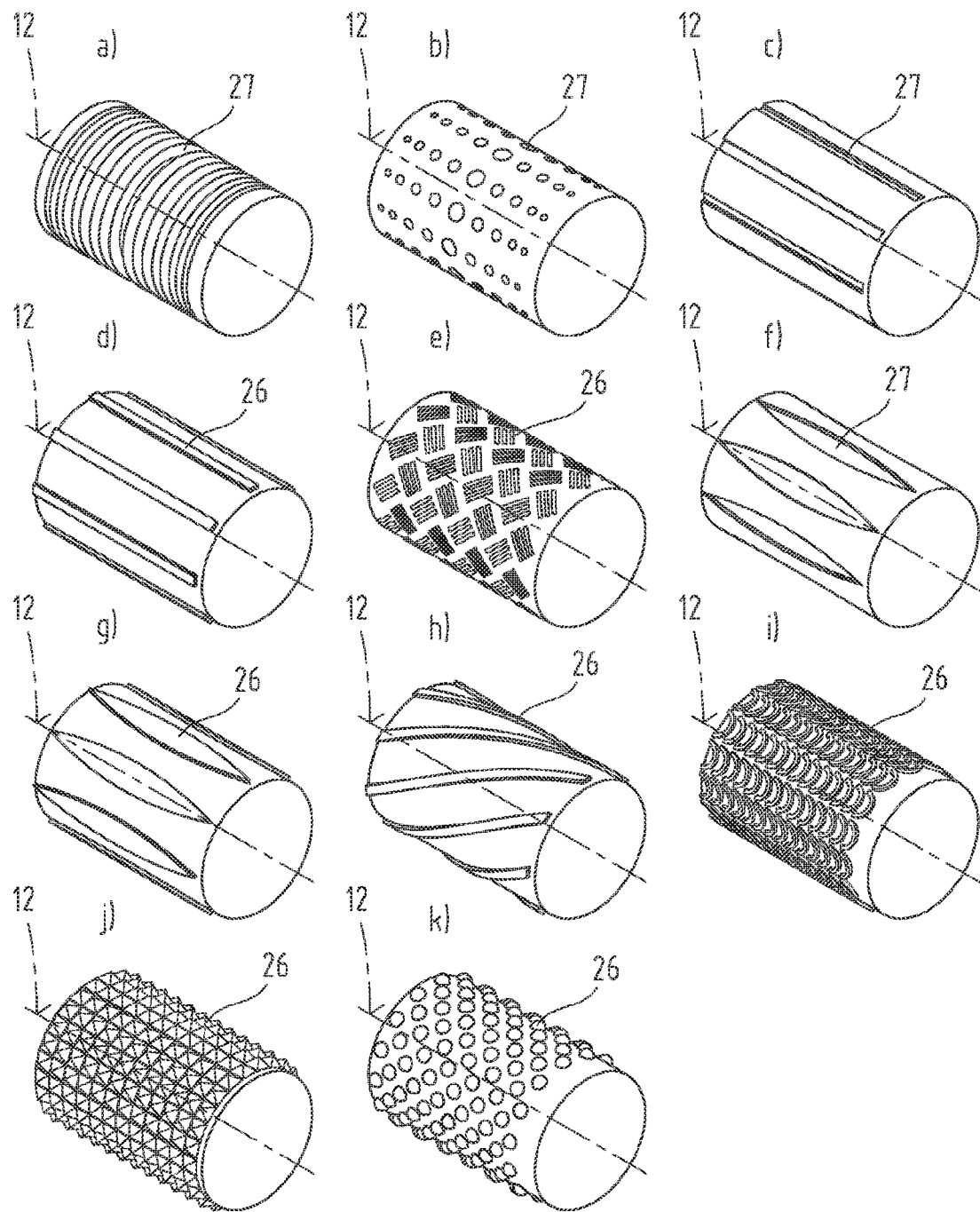

15), and wherein different machine functions for inputting at least one command into the controller (3) are associated with at least one of the actuation portions (14, 15), and wherein the at least two actuation portions (14, 15) are arranged on the lateral surface (11) of the rotating wheel (10) in such a way that the machine operator (5) may grip them with a hand (6) and/or fingers of the hand.

15 Claims, 6 Drawing Sheets

(51) Int. Cl.
    *G05G 1/10* (2006.01)
    *H01H 3/08* (2006.01)

(58) Field of Classification Search
    CPC .......... H01H 19/003; H01H 3/08; H01H 3/12; H01H 2219/012; H01H 2019/006; H01H 2231/026
    See application file for complete search history.

(56) References Cited

U.S. PATENT DOCUMENTS

| | | | |
|---|---|---|---|
| 8,742,904 | B2 | 6/2014 | Tsuchimochi et al. |
| 9,459,787 | B2 | 10/2016 | Kulczycki et al. |
| 10,050,622 | B2 | 8/2018 | Maigler et al. |
| 10,078,381 | B2 * | 9/2018 | Ding .................. G06F 3/0362 |
| 10,086,376 | B2 | 10/2018 | Knofe et al. |
| 2007/0008305 | A1 * | 1/2007 | Kosinski, II .......... G06F 3/0362 345/184 |
| 2009/0292390 | A1 | 11/2009 | Friedrich |
| 2011/0025652 | A1 | 2/2011 | Bonne |
| 2012/0055763 | A1 | 3/2012 | Chou |
| 2014/0267039 | A1 | 9/2014 | Curtis |

FOREIGN PATENT DOCUMENTS

| | | |
|---|---|---|
| DE | 10 2004 019 893 A1 | 11/2005 |
| DE | 10 2006 057 335 A1 | 8/2007 |
| DE | 10 2008 002 843 B3 | 7/2009 |
| DE | 10 2009 038 895 A1 | 9/2010 |
| DE | 10 2010 062 919 A1 | 6/2011 |
| DE | 10 2013 021 093 A1 | 6/2015 |
| EP | 0 644 566 A1 | 3/1995 |
| EP | 2 124 117 A1 | 11/2009 |
| EP | 2 193 953 A2 | 6/2010 |
| EP | 2 644 354 A2 | 10/2013 |
| EP | 2 684 652 A1 | 1/2014 |
| GB | 2 361 292 A | 10/2001 |
| WO | 2012/155167 A2 | 11/2012 |

OTHER PUBLICATIONS

Letter of Austrian Patent Attorney to European Patent Office in PCT/AT2017/060311, dated Aug. 16, 2018, with English translation of relevant parts.

* cited by examiner

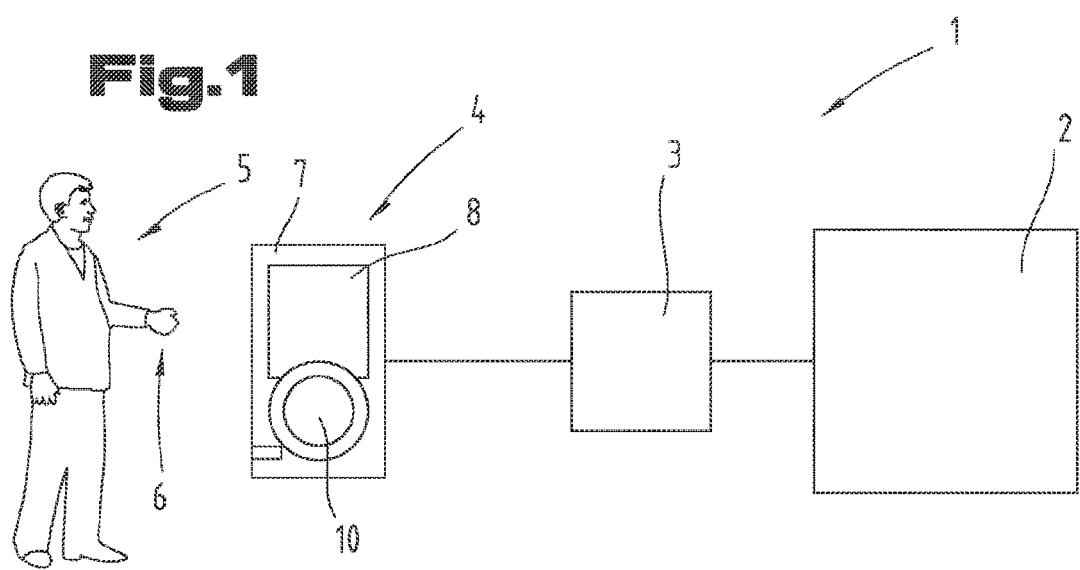
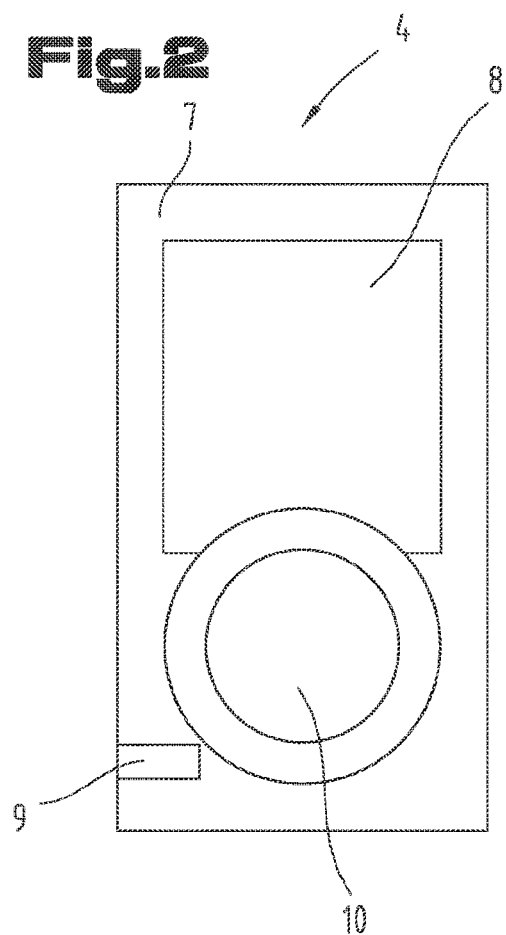
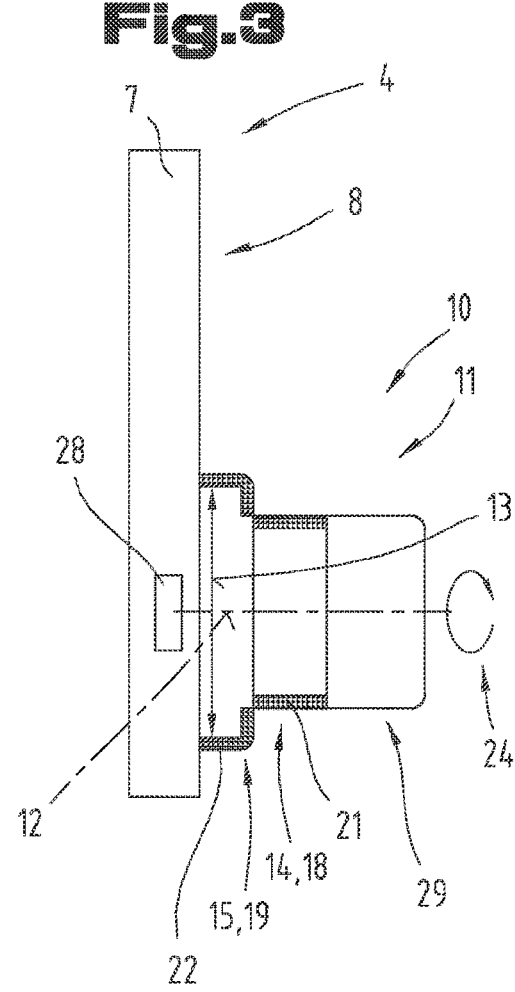

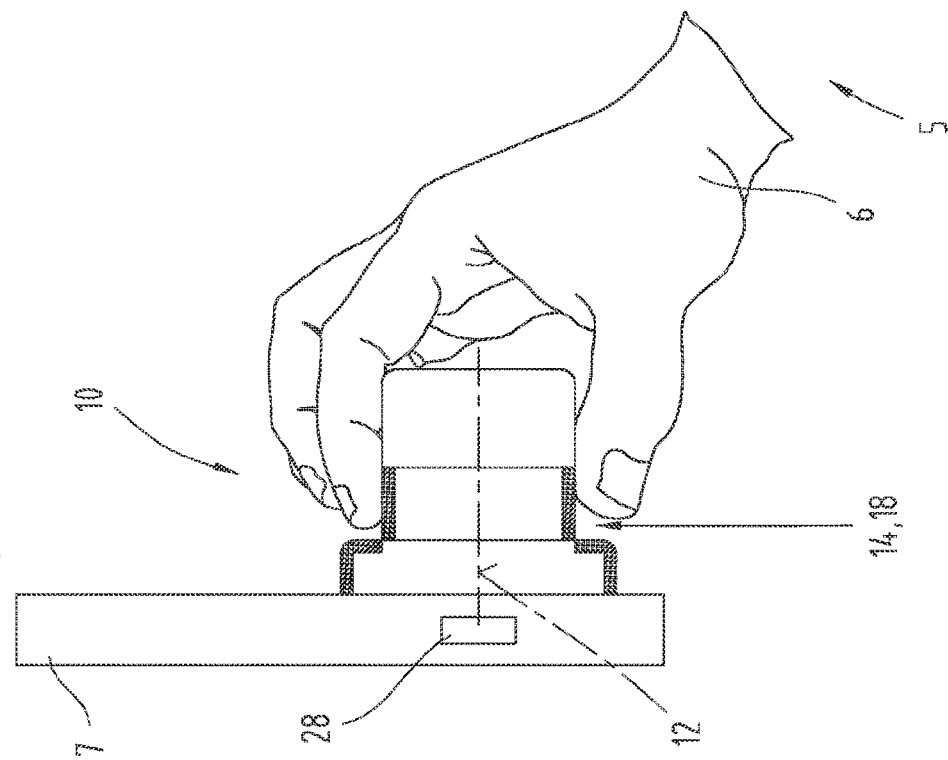
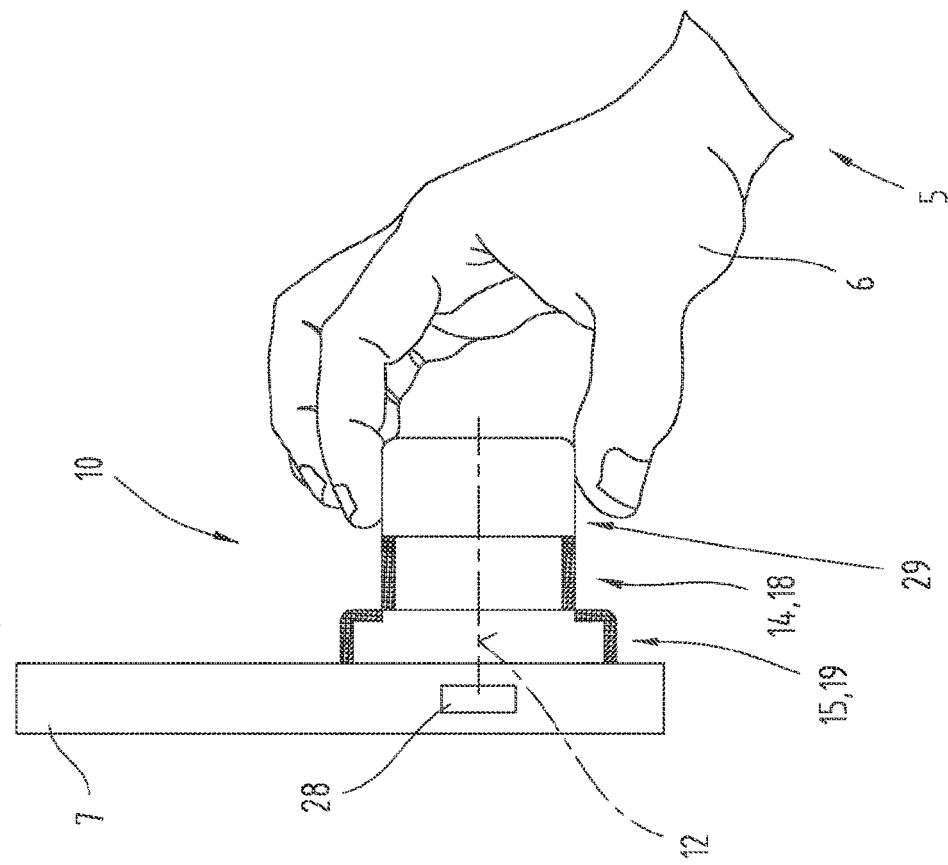

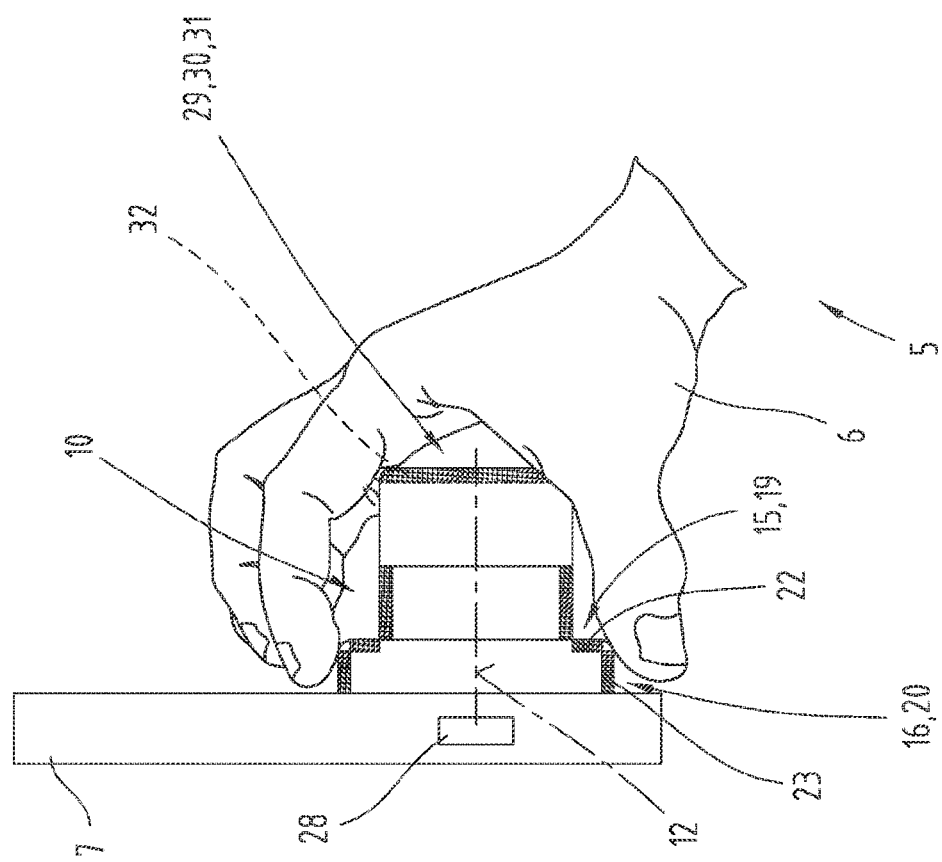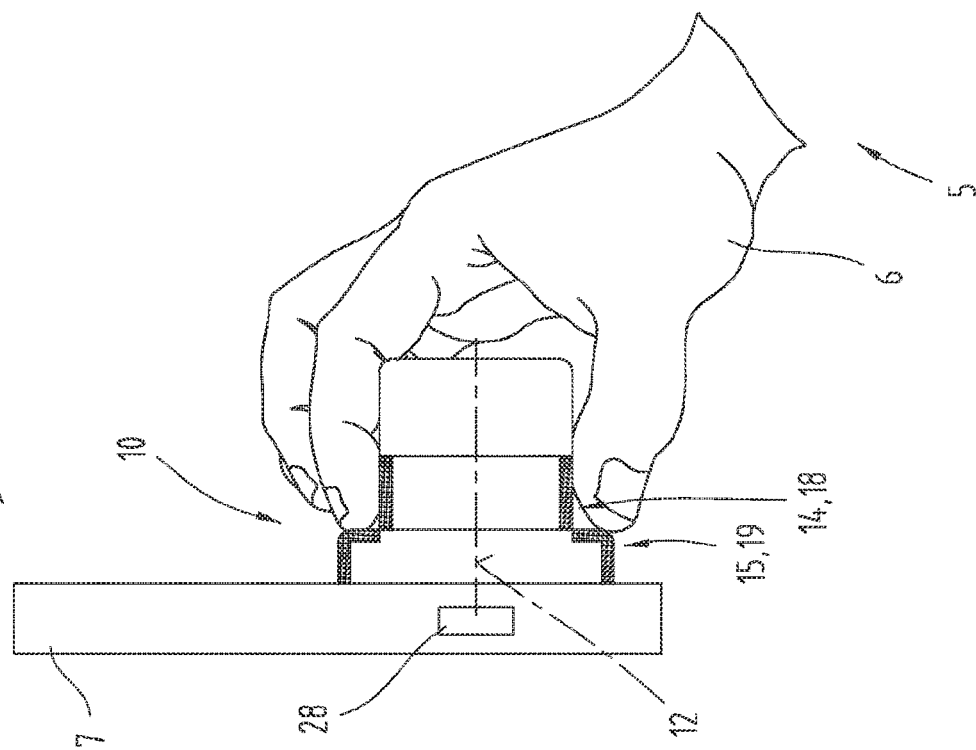

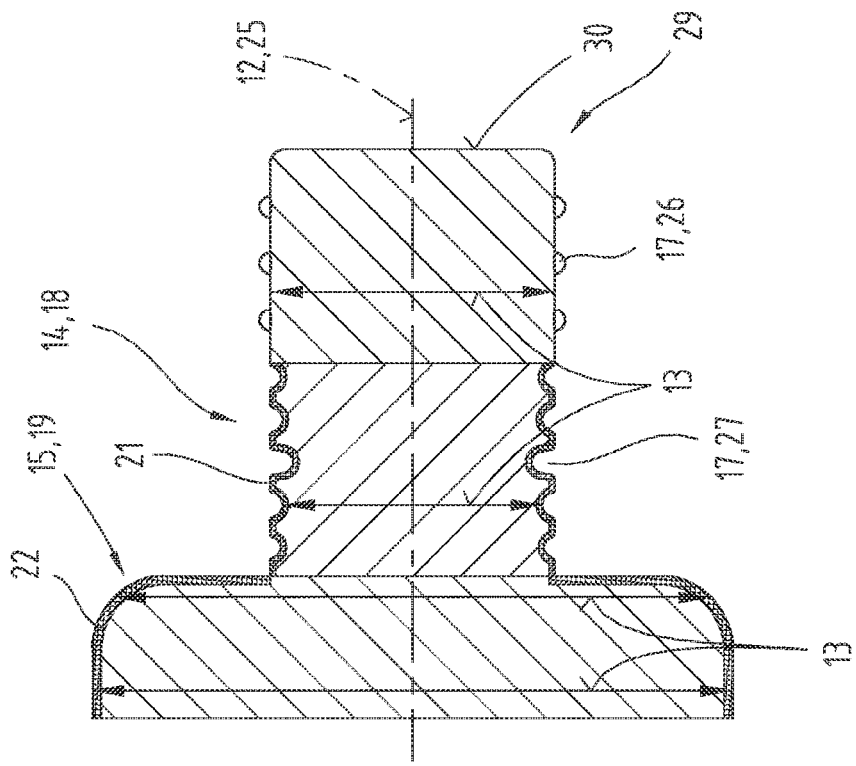
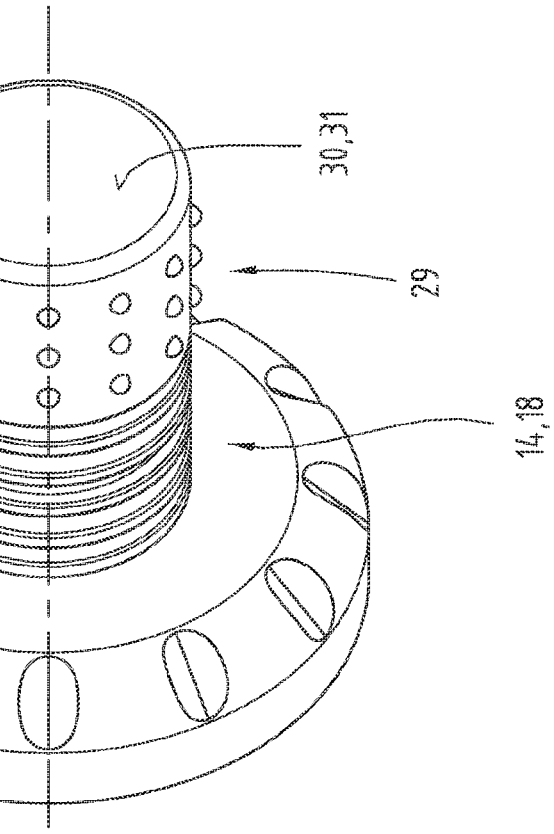

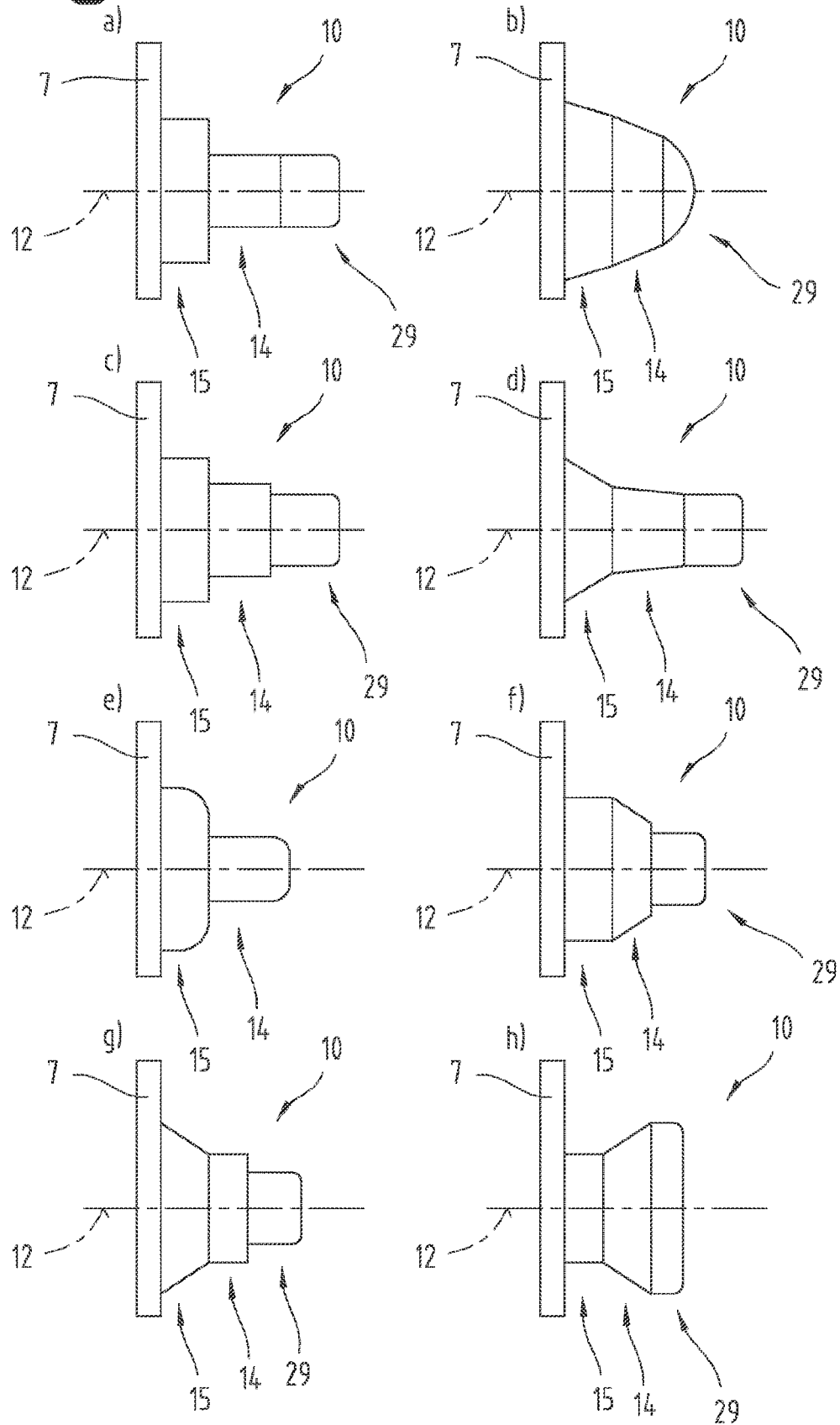

OPERATING ELEMENT FOR AN ELECTRICALLY CONTROLLED MACHINE

CROSS REFERENCE TO RELATED APPLICATIONS

This application is the National Stage of PCT/AT2017/060311 filed on Nov. 22, 2017, which claims priority under 35 U.S.C. § 119 of Austrian Application Nos. A51063/2016 filed on Nov. 23, 2016 and A50732/2017 filed on Aug. 31, 2017,the disclosures of which are incorporated by reference. The international application under PCT article 21(2) was not published in English.

The invention relates to an operating element for inputting a command into the controller of an electrically controlled machine.

An operating unit for an injection molding machine is known from AT 512 521 B1. The operating unit comprises an operating element for triggering at least one movement of a drive unit of the injection molding machine, wherein the operating element is moveable from a basic position into a triggering region triggering the movement of the drive unit. The triggering region has a plurality of intermediate positions between the basic position and a maximum position. The speed of the triggered movement of the drive unit is dependent on the distance of the selected intermediate position of the operating element from the basic position. Movements of a plurality of drive units may be triggered by the operating element, wherein a change in the drive unit actuated by the operating element is effected by pressing, pulling, pivoting and so forth of the operating element.

The operating unit known from AT 512 521 B1 has the disadvantage that an operating unit executing commands by pressing, pulling, pivoting and so forth must comprise a corresponding mechanical coupling with a switch. Such a coupling is prone to errors and expensive. Moreover, such a coupling is for example hard to realize in areas protected against explosion.

DE 19936257 A1 discloses a multiple turning knob for selecting from a range of functions of a technical system. The multiple turning knob comprises several contact-sensitive turning knobs/several zones separated by stepped transitions. The individual turning knobs/zones are concentrically arranged with different radii from the rotation axis and may be distinguishable tactilely and in terms of color. The selection of a function is carried out via the rotation of one or several turning knobs, wherein the confirmation requires the exertion of a force in radial and/or axial direction onto the axially movable multiple turning knob.

GB 2361292 A discloses a rotatable knob which has at least two zones of differing electrical conductivity. In this respect, one of the zones must be formed to be metallically conductive and be directly connected to the shaft of the rotatable knob, while the second or a further zone consisting of an electrical insulator must be formed insulated from the shaft of the rotatable knob. Different functions may be selected by a user by contacting the corresponding zone.

It was the object of the present invention to overcome the disadvantages of the prior art and to provide an improved operating element. In addition to this, it was the object of the invention to provide an improved method for inputting a command into the controller of the electrically controlled machine.

This object is achieved by means of an operating element according to the claims.

The invention relates to an operating element for an electrically controlled machine, having an operating element body and a rotating wheel for inputting a command into a controller of the machine, wherein the rotating wheel is arranged on the operating element body in a rotatable manner about a rotational axis and is surrounded by a lateral surface that has local diameter mean value specified in the perpendicular direction to the rotational axis, and on said lateral surface, the rotating wheel may be gripped and rotated by a machine operator, wherein the lateral surface of the rotating wheel has at least two actuation portions with respectively different, haptically distinguishable surface structures, wherein a sensor region of a sensor element is associated with at least one of the actuation portions, said sensor region being provided/designed for detecting the presence and/or absence of a contact by a machine operator, and wherein different machine functions, in particular movement control commands, for inputting at least one command into the controller are associated with at least one of the actuation portions, and wherein the at least two actuation portions are arranged on the lateral surface of the rotating wheel in such a way that a machine operator may grip them with a hand and/or fingers of the hand.

The different surface structures of at least two functionally different actuation portions on the rotating wheel provide the machine operator with a tactile/haptical feedback on which actuation portion their hand/at least one of their fingers is/are respectively touching in an easy way. Hence, a machine operator is enabled to primarily direct their attention to the working area of the electrical machine. In a limit case, the machine operator may work with the operating element entirely out of sight due to the intuitively designed surface structures of the rotating wheel. Due to the different surface structures of at least two actuation portions, an inadvertent actuation of a wrong actuation portion is significantly reduced. This increases the safety of the machine operator as well as of the machine controlled by the machine operator. In this respect, an increase of the process safety for the electrical machine, the tools and workpieces used is promoted particularly. The advantage of the embodiment in accordance with the invention of the operating element moreover is that by means of the operating element, a plurality of different control commands may be performed, while the operating element still has a relatively simple constructional structure. Further, by means of the surface structures, the grip of the hand of the machine operator on the rotating wheel may be significantly improved.

In addition to this, the rotating wheel may be coupled to the operating element body by means of a simple rotation sensor, for example an incremental encoder or an absolute encoder. The rotation sensor on the operating element body may be functionally coupled with the at least two actuation portions/the sensor elements of the sensor regions of the rotating wheel. The selection and/or inputting of parameters into the controller of the machine is carried out via the rotating wheel, with the rotation sensor detecting the turning/rotation movement of the rotating wheel. Depending on the position of the hand/fingers of the machine operator, the at least two actuation portions may be unambiguously associated with the rotation movement of the rotating wheel by a controller connected to the rotation sensor, in particular a control and/or evaluation device. Hence, very easy, comfortable and fast inputting of a command, in particular of a movement control commands, into the controller of the machine is possible. It is particularly advantageous if the rotating wheel has no mechanical end stop in the rotational direction.

Further, it may be useful if the actuation portions having at least two different surface structures are arranged at a distance from one another in the direction of the rotational axis and are entirely formed on the lateral surface in the circumferential direction of the respective sensor region. It is particularly advantageous if the surface structures are formed around the entire circumference, as they may thus be perceived by the machine operator independently of a twist angle of the rotating wheel. Moreover, it is of advantage that a first sensor region on a first actuation portion may serve for confirming input commands, wherein the confirmation command may for example be triggered by axial movement of the hand of the machine operator. The axial distancing/arrangement of the actuation portions in the direction of the rotational axis has the advantage that by means of moving the hand of the machine operator, several actuation portions may be reached by a hand. A sufficient distancing may be given by a separation of the actuation portions in the circumferential direction alone. In this respect, a groove or notch may be sufficient for the separation.

It may further be provided for that the at least two actuation portions of the rotating wheel are mounted rotatably about a common axis of rotation relative to the operating element body. This means that the actuation portions of the rotating wheel are rigidly coupled and thus may merely be moved into the circumferential direction of the rotating wheel simultaneously. The connection of the at least two actuation portions with the operating element is thereby greatly simplified as regards construction, since the connecting point between the rotating wheel and the operating element may be designed in form of a simple rotation sensor, which is why the rotating wheel exhibits a lower error-proneness. Because of this, a complicated construction, for example with several hollow axles which are respectively associated with an actuation portion, may be dispensed with. Inputting of at least one command into the controller is allowed for by the detection of the position of a hand/of the fingers of the machine operator on the respective actuation portion.

In addition to this, it may be provided for that the basic contour of the rotating wheel is formed rotationally symmetrical, in particular cylindrical, and that the local diameter mean value of the lateral surface amounts to between 20 mm and 80 mm, in particular between 35 mm and 60 mm, preferably between 40 mm and 50 mm. In this context, basic contour means the "contour" of the lateral surface of the rotating wheel along its rotational axis. Thus, the basic contour of the rotating wheel corresponds to the outer shape of the rotating wheel which is gripped by the machine operator. It may moreover be achieved by a rotationally symmetrical, and in this respect preferably cylindrical, embodiment of the rotating wheel that the hand of the machine operator may easily slide along the rotating wheel axially and that thus, the individual input commands may be selected and/or confirmed easily. In this regard, it is of advantage that a rotating wheel constructed such may be easily gripped and operated by the machine operator.

An embodiment according to which it may be provided for that at least one of the actuation portions has different, in particular continuously and/or discontinuously increasing and/or decreasing local diameter mean values of the lateral surface along the rotational axis, is also advantageous. The handling of a rotating wheel may be decisively improved for example by offsets and/or by stepped and/or by extending transitions. The rotating wheel may have a different local diameter mean value at each point of its rotational axis. In this regard, it is of advantage that the position of the hand/of the fingers on the lateral surface of a thus structured rotating wheel may be conceived by the machine operator relatively easily. A misoperation and/or unintended confirmation of a command to the controller of the machine may be widely prevented. Moreover, for the machine operator, a particularly ergonomic and non-fatiguing working is allowed for by the adequate design of the rotating wheel by means of offsets, however, in particular roundings. This improves the concentration of the machine operator and thus also the quality.

According to a further embodiment, it is possible that the surface structure of at least one of the actuation portions comprises round and/or longitudinally extended elevations, such as bridges, knobs, pyramids, and/or recesses, such as rills, grooves, dents, honeycombs, dimples, small pits, in relation to the local diameter mean value of the lateral surface. The position of the hand/of the fingers on the lateral surface, and thus the at least two actuation portions, may thus immediately be perceived by the machine operator. In this regard, it is of advantage that the machine operator already "feels" the relative position of their hand/of their fingers on the rotating wheel when touching the rotating wheel. In the context of the present invention, the term surface structure includes the character of the surface, in particular of the lateral surface, of the rotating wheel.

Thus, what is meant by surface structure mainly is that the person skilled in the art may determine surface characteristics for a suitable design of the surface of the actuation portions, such as elevations/recesses. However, it shall be explicitly noted that in the context of the invention, a "smooth" surface of one of the actuation portions may be understood as a surface structure. In this respect, by "smooth", a surface may be referred to which for example comprises an injection molded, cast, rolled, milled, lathed or profiled surface from the manufacturing process. It is also conceivable that the surface is subsequently subjected to mechanical and/or chemical processing, such as an etching process. The different surface roughnesses alone may be perceived as different surface structures by a machine operator. From a manufacturing point of view, it is of advantage if an actuation portion thus comprises a "smooth" surface as results from the manufacturing process. This "smooth" surface does essentially not require an expenditure of time for the surface structure and is still sufficiently easy to distinguish tactilely and/or haptically for the machine operator due to the different surface structures of the other actuation portions. A combination of different elevations and/or recesses and/or surface roughnesses is also conceivable for the design of an actuation portion.

It may further be useful if the longitudinally extended elevations and/or recesses have a proportion of a larger extension to a shorter extension of the elevations, or the recesses respectively, on the lateral surface of larger than 1.5, preferably larger than 5. It is of advantage to provide the surface structure in a sufficient size for ensuring the distinguishability of the elevations and/or recesses from one another. This is particularly helpful if for example longitudinally extended dents or bridges are formed as surface structures. In this respect, longitudinally extended elevations and/or recesses closed in circumferential direction are also referred to. Elevations and/or recesses inclined in the direction of the rotational axis or in an angle to the rotational axis are equally referred to.

In addition to this, it may be provided for that the surface structure of at least one of the actuation portions is formed evenly across the lateral surface of the respective actuation portion. This simplifies the association of a surface structure to an individual actuation field.

It may further be provided for that the surface structure of at least one of the actuation portions is formed symmetrically in at least one direction, preferably in the circumferential direction, across the lateral surface of the respective actuation portion. The symmetrical design of the surface structure offers manufacturing advantages and may be realized relatively cost-effectively. Furthermore, if the rotating wheel does not have a mechanical stop, the starting position of the rotating wheel when gripped by a machine operator is irrelevant. In addition to this, no "relearning" from one rotating wheel of an operating element of a machine to another rotating wheel/operating element of another machine is required by the machine operator.

According to a specific embodiment, it is possible that the surface structure of at least one of the actuation portions is formed irregularly across the lateral surface of the respective actuation portion. For certain applications, it may be of advantage if the surface structure is formed irregularly across portions of the rotating wheel. This may for example be the case for brushed or shot-peened surfaces. Such methods often do not form sharply defined boundary surfaces in the rim regions. However, these surface structures may be realized relatively easily and thus cost-effectively.

According to an advantageous embodiment, it may be provided for that the surface structure of at least one of the actuation portions has a proportion of the deviation of the highest elevation and/or lowest recess of the lateral surface in perpendicular direction to the rotational axis to the local diameter mean value of larger than 0.001, preferably 0.005, more preferably of larger than 0.01. It proved advantageous that the surface structure, especially in form of elevations and/or recesses, is scaled with the basic contour/with the local diameter mean value. It became apparent that a minimum deviation of the elevations and/or recesses from the local diameter mean value is particularly favorable for a sufficient tactile and/or haptic perception by the machine operator.

In particular, it may be of advantage if the lateral surface of at least one of the actuation portions consists predominantly of metal. Hence, a particularly robust construction of the rotating wheel is promoted. In this regard, it is of advantage that sensor elements may be used for a conductivity measurement in at least one of the actuation portions. A high sensitivity and thus good detectability of the position of the hand/of the fingers of the machine operator is thus facilitated.

It may further be provided for that the surface structure of at least one of the actuation portions at least partially comprises a second material, preferably a plastic material. It became apparent that for an optimized distinguishability of two different surface structures, not only geometrical characteristics but also the "gripping feeling" may act a part. Thus, it may be of advantage if a second material for example has a higher felt surface temperature than the first material. Moreover, surface structures from one or several further materials may be applied relatively easily. Here, for example spraying, bonding or coating methods and the like are conceivable. Furthermore, safety against slipping of the hand/the fingers of the machine operator may be increased by the selection of a further material. This provides significant safety advantages. In the event that the rotating wheel is manufactured from metal, a second material, in this respect particularly a dielectric material, such as a plastic material, provides the advantage that one or several sensor elements associated with the actuation portions may be designed as capacitive sensors. Such capacitive sensors may for example be designed as proximity sensors, position sensors, acceleration sensors or pressure sensors. The variety of possible commands to a controller of the machine is thus significantly increased.

In addition to this, it may be provided for that at least one actuation portion comprises a pressure-sensitive sensor element. The parameter selection, confirmation of commands, and the like may be carried out by means of the operating element according to the invention via the at least two actuation portions of the rotating wheel towards the controller of the machine. However, it proved particularly advantageous that for signaling a state of exception towards the controller of the machine, a pressure-sensitive sensor element is provided. When recognizing a dangerous situation for example for the tool or the workpiece, a machine operator may trigger a "stop command" to the controller of the machine by exerting a force. An unintended actuation is efficiently prevented by the "normal operating mode" via the rotation movement of the rotating wheel and confirmation of the commands by means of moving the fingers across at least one actuation field. The sensor region of the pressure-sensitive sensor element may be located on the lateral surface in circumferential direction in this regard.

An embodiment, according to which it may be provided for that the pressure-sensitive sensor element is arranged such that its sensor region is essentially directed towards the rotational axis is also advantageous. In this regard, it is of advantage that for the "normal operating mode" of the rotating wheel essentially merely rotation movements of the rotating wheel about a rotational axis, as well as movements of the hand/of the fingers of a machine operator on the lateral surface of the rotating wheel are required. A movement, associated with a force effect, into the direction of the rotational axis onto the pressure-sensitive sensor element represents a great, and thus a clear, difference to the "normal operating mode" and may thus be unambiguously associated with an exceptional situation by the machine operator. The application of force into the direction of the rotational axis may in a limit case even be carried out by a punch onto the rotating wheel by the machine operator. This allows for a short reaction time of the machine operator, which involves an increase of the safety during operation.

According to a further embodiment, it is possible that the rotating wheel is mounted on the operating element body movably in the direction of the rotational axis and a switching or sensor element is formed, which is provided for signaling or triggering a quick stop or emergency stop command depending on the movement of the rotating wheel along its rotational axis. In this further embodiment, it is advantageous that the command input for an exceptional situation into the controller of the machine is decoupled from the at least two actuation portions on the lateral surface. Due to the compact construction of the rotating wheel, which merely comprises a common axis of rotation for the at least two actuation portions, a movement of the rotating wheel along its rotational axis may be carried out by the machine operator very easily. The position of the application of force on the rotating wheel thus plays a minor part for the movement. In a limit case, it may even be carried out by a punch onto the rotating wheel by the machine operator such that a movement into the direction of the rotational axis is induced. It became apparent that a movement of the rotating wheel may be very well perceived by the machine operator. The switching or sensor element which is provided for signaling a "quick stop" or "emergency stop command" to the controller of the machine may be integrated in the operating element in a very easy and robust manner. This represents a cost-effective and very safe construction. It may also be provided for that the rotating wheel is locked in its position after the movement along the rotational axis. In this case, unlocking the rotating wheel may only take place after an acknowledgment of the quick stop or emergency stop command.

In addition to this, it may be provided for that a first, second and/or further actuation portion is respectively associated with a machine function selected from the group working feed, spindle speed, no-load feed, axial infeed, radial infeed, tool change. The operating element according to the invention proved particularly advantageous for controlling manufacturing plants/machine tools. In particular, the operation for example of CNC milling machines, CNC lathes but also injection molding machines may be significantly facilitated by means of the operating element. In case of CNC milling machines, the most common functions/movement commands of the machine, such as working feed, spindle speed and traversing speed without load (no-load feed) may be operated by means of the actuation portions provided on the rotating wheel for this purpose and be input into the controller of the machine relatively easily. Further functions such as axial infeed, radial infeed or tool change may also be input into the controller of the machine by means of the operating element according to the invention.

All sensors arranged on the rotating wheel may be designed as individual sensor elements which are provided for detecting the respectively associated sensor region. However, it is also conceivable that two or a plurality of sensor elements are associated with a sensor region, which detect the sensor region. The provision of several sensor elements for a sensor region may provide the advantage that a redundancy is allowed for and thus, failure of a sensor element may be compensated for. This may in particular be required for increasing the safety of machinery.

In particular, it may be provided for that the sensor elements are designed for detecting contacts by the machine operator in certain regions/actuation portions of the rotating wheel.

The sensor elements as such may for example be designed as resistive sensors.

Another possibility is that the sensor elements are designed in form of optical sensors.

In general, the sensor elements may be realized as any sensor elements suitable for detecting a contact of the rotating wheel by the hand/the fingers of the machine operator. It is particularly preferably to form the sensor elements as capacitive sensors in this regard.

The sensor elements may be arranged on the surface of the rotating wheel, or cast into the rotating wheel or integrated by means of other measures such as the provision of corresponding receiving regions.

In particular, a combination of sensor elements with surface structures of the actuation portions is conceivable.

For the purpose of better understanding of the invention, it will be elucidated in more detail by means of the figures below.

These show in a respectively very simplified schematic representation:

FIG. 1 a layout of a manufacturing plant with a machine, a controller and an operating element;

FIG. 2 the operating element as viewed from a front view;

FIG. 3 the operating element as viewed from a side view;

FIG. 4 the operating element as viewed from a side view with a hand of a machine operator in the gripping region;

FIG. 5 the operating element as viewed from a side view with the hand of the machine operator in the first actuation portion with a first sensor region;

FIG. 6 the operating element as viewed from a side view with the hand of the machine operator in the first and second actuation portions with a first and second sensor region;

FIG. 7 the operating element as viewed from a side view with the hand of the machine operator on the peripheral section of an offset;

FIG. 8 the operating element with different surface structures of the individual actuation portions in an oblique view (a); in a sectional view in the longitudinal direction (b);

FIG. 9 different examples (a)-(h) of basic contours of a rotating wheel;

FIG. 10 different examples (a)-(k) of different surface structures.

First of all, it is to be noted that in the different embodiments described, equal parts are provided with equal reference numbers/equal component designations, where the disclosures contained in the entire description may be analogously transferred to equal parts with equal reference numbers/equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a manufacturing plant 1 with an electrically controlled machine 2, a controller 3 for the machine 2 and an operating element 4 for inputting control commands into the controller 3 by a machine operator 5. In particular, it is provided for that the machine operator 5 operates the operating element 4 with their hand 6.

The machine 2 may for example be a milling machine, a lathe or an injection molding machine. Moreover, it is also conceivable that the machine 2 is a robot or another machine in industrial application. In particular, it may be provided for that the machine 2 serves the purpose of manufacturing components.

The controller 3 may be formed by any conceivable type of controller. This may for example be an industrial computer, a programmable logic controller or another controller suitable for converting the commands input via the operating element 4 into movement commands for the machine 2.

In FIGS. 2 and 3, the operating element 4 is shown as viewed from a front view/in a side view.

As is apparent from these two figures, it may be provided for that the operating element 4 comprises an operating element body 7 which constitutes the central component of the operating element 4 and which may for example be defined by a housing. Moreover, it may be provided for that a display 8 is incorporated in the operating element body 7. The display 8 serves the purpose of displaying menu items, speed settings and other parameters or options, which are required for controlling the machine 2. In a further embodiment variant, it may also be provided for that the display 8 is not integrated in the operating element 4 but that the display 8 is arranged at another location in the manufacturing plant 1.

In addition to this, it may be provided for that the operating element 4 is stationarily arranged on the manufacturing plant 1 and coupled to the manufacturing plant 1 by means of a wired connection.

In an alternative embodiment variant, it may also be provided for that the operating element 4 is designed in form of a remote control and communicates with the controller 3 via a wireless connection.

Moreover, it may be provided for that the controller 3 is integrated in the operating element 4 and that the control commands are provided to the machine 2 directly by the operating element 4.

As is further apparent from FIG. 2, it may be provided for that one or several push buttons 9 are arranged on the operating element 4. The push buttons 9 may serve the purpose of inputting diverse commands into the operating element 4 by the machine operator 5.

According to the invention, a rotating wheel 10, which is rotatable relative to the operating element body 7 about a rotational axis 12, is arranged on the operating element body 7. The rotating wheel 10 constitutes a central part of the operating element 4. The push button 9 may optionally be excluded from the operating element body 7 and its function may also be realized in the rotating wheel 10.

Contrary to the embodiments known from the prior art, it is provided for that the rotating wheel 10 may be mounted to the operating element body 7 merely rotatable about the rotational axis 12. The rotating wheel 10 is mechanically connected to the operating element 7 by means of an axis of rotation 25 and mounted rotatably relative to it. Due to the embodiment of the rotating wheel 10 described in more detail below, it is not obligatorily required that it is axially movable/pivotable relative to the operating element body 7.

As the rotating wheel 10 is incorporated in the operating element body 7 in a rotatable manner only, the connecting point between the rotating wheel 10 and the operating element body 7 may be designed in form of a simple rotation sensor, which is why the rotating wheel 10 exhibits a lower error-proneness. The connecting point of the rotating wheel 10 may be designed as an "endless stop". In this case, no mechanical end stop of the rotating wheel 10 in the rotational direction is provided for.

In particular, it may be provided for that the rotating wheel 10 has a lateral surface 11 which surrounds the rotational axis 12 and serves the purpose that the machine operator 5 may grip the rotating wheel 10 and turn it about its rotational axis 12. In particular, it may be provided for that the lateral surface 11 of the rotating wheel 10 is formed essentially rotationally symmetrical with respect to the rotational axis 12 and comprises a local diameter mean value 13.

The lateral surface 11 of the rotating wheel 10 may comprise at least two actuation portions 14, 15 with different surface structures 17. A sensor region 18, 19 of a sensor element 21, 22 is associated with at least one of the actuation portions 14, 15. Different machine functions for inputting at least one command into the controller 3 may be associated with each of the actuation portions 14, 15 of the rotating wheel 10. The actuation portions 14, 15 are arranged such on the lateral surface 11 of the rotating wheel 10 that they may be gripped by the machine operator 5 with a hand 6 or with one or several fingers of the hand 6 as shown in FIGS. 4 through 7.

It may further be provided for that a first actuation portion 14 is formed on the rotating wheel 10, with the sensor region 18 of said actuation portion comprising the portion of the lateral surface 11 of the rotating wheel 10 which is detected by a first sensor element 21. It may further be provided for that a gripping region 29, which has an axial distance from the actuation portion 14/from the first sensor region 18, is formed on the lateral surface 11 of the rotating wheel 10. It may particularly be provided for that no sensor element is arranged in the gripping region 29.

As is further apparent from FIG. 3, it may be provided for that the first actuation portion 14 is arranged closer to the operating element body 7 than the gripping region 29. The exemplary representations in FIGS. 3 through 7 respectively show a rotating wheel 10 comprising an offset. Further embodiments of geometries for a rotating wheel 10 in FIG. 8, complementing each other with FIGS. 3 through 7 and 9, apply to the present invention in like manner.

The first actuation portion 14, as well as a corresponding sensor region 18, may be entirely formed on the rotating wheel 10 and comprise a sufficiently large axial extension for detecting the hand 6 of the machine operator 5.

It may further be provided for that at least a second actuation portion 15 with a corresponding second sensor region 19 and a sensor element 22 detecting this sensor region 19 is arranged on the rotating wheel 10. In particular, it may be provided for that the second sensor region 19 entirely covers the portion of the lateral surface 11 of the rotating wheel 10 in the second actuation portion 15.

It is particularly advantageous if the actuation portions 14, 15 comprising at least two different surface structures 17 are arranged at a distance from one another in the direction of the rotational axis 12. A sufficient distancing may be given by a separation of the actuation portions on the lateral surface 11 in the circumferential direction 24 alone. In this respect, a groove or notch may be sufficient for the separation. The surface structure 17 may be formed around the entire circumference of an actuation portion 14, 15, whereby it may be perceived by the machine operator 5 independently of a twist angle of the rotating wheel 10.

FIGS. 4 through 7 show different possible postures of the hand 6 of the machine operator 5.

In FIGS. 4 through 7, the operating element 4, as represented in FIG. 3, is used. In FIGS. 8 and 9, the operating element 4 is not shown to place special emphasis on the embodiment of the rotating wheel 10.

In FIG. 4, a first possibility of how the rotating wheel 10 of the operating element 4 may be gripped is shown. According to the representation in FIG. 4, the rotating wheel 10 may be gripped in the gripping region 29, wherein it may be provided for that no sensor element is formed in the gripping region 29. Due to the fact that it may be provided for that all other regions of the rotating wheel 10 are equipped with actuation portions 14, 15, in case of a rotation movement on the rotating wheel 10, the hand 6/the fingers of the machine operator 5 may unambiguously be assigned to the gripping region 29.

In case of the gripping region 29 not comprising a corresponding sensor region, the gripping region 29 may still serve as an independent actuation portion 14, 15. Accordingly, a rotation movement of the rotating wheel 10 by the machine operator 5 gripping in the gripping region 29 may be associated with one or several commands for the controller 3 of the machine 2.

As is apparent from FIG. 5, it may also be provided for that the hand 6 of the machine operator 5 grips the rotating wheel 10 in the first actuation portion 14/the first sensor region 18. This may also trigger a separate command in the controller 3 of the machine 2.

It may further be provided for that, as shown in FIG. 6, the hand 6/the fingers of the machine operator 5 grip(s) the rotating wheel 10 such that both the first actuation portion 14/the first sensor region 18 and the second actuation portion 15/the second sensor region 19 are contacted. This may also trigger a separate command. For the purpose of abbreviation, this is referred to as gripping the rotating wheel 10 in the second sensor region 19.

For example, it is possible that the hand 6/the fingers of the machine operator 5 slide(s) from a posture as represented in FIG. 5 into a posture as represented in FIG. 6. This movement is preferably used as confirmation command.

The operating element 4 according to the invention proved particularly advantageous for controlling manufacturing plants 1. In particular, the operation for example of CNC milling machines, CNC lathes but also injection molding machines is significantly facilitated by means of the operating element 4. In case of CNC milling machines, the most common functions/movement commands of the machine 2, such as working feed, spindle speed and traversing speeds between the processing steps may be operated by means of the actuation portions 14, 15 provided on the rotating wheel 10 for this purpose and be input into the controller 3 of the machine 2 relatively easily. Further frequently used functions of the machine 2 such as axial infeed, radial infeed or tool change may be selected and confirmed by means of the rotating wheel 10 in like manner or optionally be made available to the machine operator 5 by means of one or several push button(s) 9.

As can be gathered from FIGS. 4 through 6 and as was explained for the respective figures, it may be provided for that by the respective postures of the hand 6/of the fingers of the machine operator 5, different commands may be given to the controller 3 of the machine 2. In particular, movements of the machine 2 or of a tool of the machine 2 into a direction may be selected and the traversing/movement speeds of these may be set by the machine operator 5 via the rotating wheel 10. For example, a forward movement of the machine 2 or of a tool of the machine 2 in two different predetermined traversing speeds/a backward movement in two different predetermined traversing speeds and also a traversing stop may be selectable on the display 8. In a first mode, it may be provided for that the rotating wheel 10 is gripped in the first actuation portion 14/sensor region 18 according to the representation in FIG. 5, wherein a selection field is drawn over a field on the display 8 for a traversing stop. Subsequently, the desired traversing option may be selected by turning the rotating wheel 10 and the confirmation command may again be given by moving forward of the hand 6. Hence, the desired and preselected traversing movement may be initiated.

During execution of the traversing movement, it is conceivable that a further desired traversing movement is selected on the display 8 and again chosen by confirmation by moving forward of the hand 6.

In particular, it may be provided for that the traversing movement is only carried out as long as the hand 6 is in one of the sensor regions 18, 19 and that the traversing movement is stopped when the rotating wheel 10 is released.

In the context of the present invention, for evaluating the respective sensor signals of a sensor element, the latter is connected to the controller 3 of the electrical machine. The controller 3 implements the selected parameters, options, control commands by activating the respective actuators of the machine 2.

FIG. 7 shows a further and possibly independent embodiment of the rotating wheel 10, wherein again, equal reference numbers/component designations are used for equal parts as in FIGS. 1 through 6 above. In order to avoid unnecessary repetitions, it is pointed to/reference is made to the detailed description in FIGS. 1 through 6 preceding it.

As represented in FIG. 7, it may further be provided for that an additional sensor region 31 with a corresponding sensor element 32 is formed on a front side 30 of the rotating wheel 10. Such an additional sensor region 31 may also serve the purpose of inputting control commands, in particular a stop command. In this regard, the additional sensor element 32 may particularly be a pressure-sensitive sensor element.

In addition to this, it may be provided for that further actuation portions/corresponding sensor regions are formed on the rotating wheel 10.

As can be seen in FIG. 8, the lateral surface 11 of the rotating wheel 10 may be divided into at least two actuation portions 14, 15 with different surface structures 17. FIG. 8a shows an oblique view of a rotating wheel 10 comprising elevations 26 in the form of knobs distributed irregularly in the circumferential direction in the gripping region 29. In this regard, the gripping region 29 may be designed as an individual, additional actuation portion and/or sensor region. Furthermore, FIG. 8a shows a first actuation portion 14 comprising recesses 27 in form of grooves extending in the circumferential direction as surface structure 17. The grooves have different depths in the direction of the rotational axis. The second actuation portion 15 of the rotating wheel 10 is arranged closest to the operating element body 7 in the direction of the rotational axis 12 and is formed in the form of a disk with a rounded offset. The surface structures 17 of the second actuation portion 15 are formed as oval/eye-shaped recesses 27 on the rounding of the offset as well as a smooth surface of the lateral surface 11 parallel to the rotational axis 12 of this actuation portion 15.

By means of the example in FIG. 8, the plurality of design choices is to be illustrated. Moreover, FIG. 8b clearly shows that the local diameter mean value 13 depends on the basic contour of the rotating wheel/of the individual actuation portions.

FIG. 9 shows some examples of different basic contours of the rotating wheel 10. In this regard, the basic contour essentially corresponds to the "contour" of the lateral surface 11 along its rotational axis 12. The basic contour of the rotating wheel 10 is preferably formed rotationally symmetrically around the rotational axis 12.

It may particularly well be gathered from FIGS. 8 and 9 that at least one of the actuation portions 14, 15 may have different local diameter mean values 13 along the rotational axis 12. The actuation portions 14, 15 may in particular have continuously and/or discontinuously increasing and/or decreasing local diameter mean values 13. The rotating wheel 10 may thus have one or several offset(s) and/or steps and/or extending transitions (cf. FIGS. 9a-h). This increases the manageability of the rotating wheel 10 by the machine operator 5. It may be advantageous if potential offsets and/or steps and/or the ends of an extension limit the respective actuation portions 14, 15 in the direction of the rotational axis 12. As schematically depicted in FIGS. 8 and 9, a basic contour may be composed of several geometrically simply bodies, such as discs, cones, spherical segments, and determine the outer shape of the rotating wheel 10.

Thus, the rotating wheel 10 does not obligatorily have to be understood as "one piece" but may also be composed of several sections. This may offer manufacturing advantages. However, in such a case, the sections should be connected by means of a common axis of rotation 25 to unite to a rotating wheel 10, as well as to be connected to the operating element 7.

Local diameter mean values 13 of the lateral surface 11 between 20 mm and 80 mm, in particular between 35 mm and 60 mm, preferably between 40 mm and 50 mm, proved to be particularly well to grip by the machine operator 5.

Furthermore, as represented in FIG. 7, the hand 6 of the machine operator 5 may grip the rotating wheel 10 also on the peripheral region of an offset. If the second sensor region 19 extends across the front side and the peripheral region of an offset, this results in the second sensor region 19 being activated.

According to the exemplary embodiment in FIG. 7, it is also conceivable that a actuation portion 16/a third sensor region 20, which is detected by a third sensor element 23, is formed in the peripheral region of an offset. In such an embodiment, contacting the front side of an offset and contacting the peripheral region of said offset may respectively trigger different commands. For example, it is also conceivable that when a third sensor region 20 is used, the hand 6 of the machine operator 5 is positioned according to the representations in FIG. 5 or 6 and only one or several fingers are placed on the third actuation portion 16/the third sensor region 20 to trigger a certain command.

The mentioned exemplary embodiments of the figure descriptions 1 through 7 analogously apply to the exemplary embodiments of different geometries of the rotating wheel 10 as shown in FIGS. 8 and 9.

According to a further embodiment, it is possible that the surface structure 17 of at least one of the actuation portions 14, 15, 16 comprises round and/or longitudinally extended elevations 26, such as bridges, knobs, pyramids, scales and/or recesses 27, such as rills, grooves, dents, honeycombs, dimples, small pits, in relation to the local diameter mean value 13 of the lateral surface 11. The position of the hand 6/of the fingers on the lateral surface 11, and thus the at least two actuation portions 14, 15, 16, may thus immediately be perceived by the machine operator 5. In this regard, it is of advantage that the machine operator 5 already "feels" the position of their hand 6/of their fingers when touching the rotating wheel 10. An unambiguous association of the surface structures 17 with commands to the controller 3 of the machine 2 is thus allowed for.

Some examples of possible surface structures 17 are shown in FIGS. 10 a-k.

In the context of the present invention, the term surface structure 17 includes the character of the surface, in particular of the lateral surface 11, of the rotating wheel 10. A "smooth" surface of one of the actuation portions 14, 15, 16 may be understood as a surface structure. Different surface roughnesses alone may be perceived as different surface structures 17 by a machine operator 5. However, it is particularly preferably if the surface structures 17 of the at least two actuation portions 14, 15, 16 may be distinguished from one another clearly.

A combination of different elevations 26 and/or recesses 27 and/or surface roughnesses are also conceivable for the design of the surface structures 17 of at least two actuation portions 14, 15, 16.

It may further be provided for if longitudinally extended elevations 26 and/or recesses 27 have a proportion of a larger extension to a shorter extension of the elevations 26, or the recesses 27 respectively, on the lateral surface 11 of larger than 1.5, preferably larger than 5. This may particularly well be gathered from the examples in FIGS. 10a and 10c-i. It may likewise be provided for that the surface structure 17 of at least one of the actuation portions 14, 15 is formed symmetrically in at least one direction, preferably in the circumferential direction, across the lateral surface of the respective actuation portion.

In particular, surface structures 17 may be formed extending continuously in the circumferential direction 24 (cf. FIGS. 10a and h). Likewise, the surface structures 17 may be formed to be inclined in the direction of the rotational axis 12 or in an angle to the rotational axis 12 (in particular see FIG. 10h). Moreover, the surface structures 17, in particular elevations 26 and/or recesses 27, may be formed to be staggered to one another into at least one direction (for example see FIG. 10e, k). Such a surface structure 17 may for example be a rippled or knobbed surface.

It may moreover be gathered from FIGS. 8 and 10 that the surface structure 17 of at least one of the actuation portions 14, 15 may be formed evenly across the lateral surface 11 of the respective actuation portion 14, 15. The even and/or symmetrical design of the surface structure 17 may offer manufacturing advantages and be realized cost-effectively.

According to a further embodiment, it may also be provided for that the surface structure 17 of at least one of the actuation portions 14, 15 is formed unevenly across the lateral surface 11 of the respective actuation portion 14, 15. Irregular surface structures 17 may be realized relatively easily and cost-effectively in particular with stochastic processing methods such as sandblasting, shot peening, or processing methods with an undefined cutting edge such as grinding or brushing. Such methods often do not form sharply defined boundary surfaces in the rim regions.

According to an advantageous further embodiment, it may be provided for that the surface structure 17 of at least one of the actuation portions 14, 15 has a proportion of the deviation of the highest elevation 26 and/or lowest recess 27 of the lateral surface 11 in perpendicular direction to the rotational axis 12 to the local diameter mean value 13 of larger than 0.001, preferably 0.005, more preferably of larger than 0.01. As shown in FIGS. 8, 9 and 10, the local diameter mean values 13 may be easily determined according to the position along the rotational axis 12. For a sufficiently good perceptibility by the machine operator 5, such minimum deviations of the elevations 26 and/or recesses 27 are particularly advantageous. The height of the elevations 26/the depth of the recesses 27 may also be formed such that these represent a suitable receptacle for the fingers of the machine operator 5 between the elevations 26/in the recesses 27 (cf. for example FIG. 8a).

In particular, it may be of advantage if the lateral surface 11 of at least one of the actuation portions 14, 15 consists predominantly of metal. In this respect, the high mechanical wear resistance as well as the good workability of metals are particularly advantageous for a robust realization of the rotating wheel 10. Moreover, the sensor elements 21, 22 associated with the sensor regions 18, 19 may be for example be designed as sensor elements for electric conductivity measurement.

In a further advantageous embodiment, it may be provided for that the surface structure 17 of at least one of the actuation portions 14, 15 at least partially comprises a second material, preferably a plastic material. The application or incorporation of a second material as surface structures 17 may increase the safety against slipping of the hand 6/the fingers of the machine operator 5. In the event that the rotating wheel 10 is predominantly manufactured from metal, a second material, in this respect particularly a dielectric material, such as a plastic material, provides the advantage that one or several sensor elements 21, 22 associated with the actuation portions 14, 15/the sensor regions 18, 19 may be designed as capacitive sensors. Such capacitive sensors may for example be designed as proximity sensors, position sensors, acceleration sensors or pressure sensors. The variety of possible commands to a controller 3 of the machine 2 is thus significantly increased.

It may further be provided for that at least one actuation portion 14, 15 comprises a pressure-sensitive sensor element. As results from the afore description, the majority of the parameter selection and machine commands may be carried out using the rotating wheel 10. However, it proved particularly advantageous that for signaling a state of exception towards the controller 3 of the machine, a pressure-sensitive sensor element is provided. In case of a dangerous or exceptional situation, the machine operator 5 may trigger a "stop command" to the controller 3 of the machine 2 by exerting a force. An unintended triggering or actuation of this "stop command" is efficiently prevented by the aforementioned "normal operating mode", for example via rotation movement of the rotating wheel 10 and/or movement of the fingers of the machine operator 5. The sensor region 18, 19 of a pressure-sensitive sensor element may preferably be located on the lateral surface 11 in circumferential direction 24 in this regard.

However, a realization, according to which it may be provided for that a pressure-sensitive sensor element 23, 32 is arranged such that its sensor region 20, 31 is essentially directed towards the rotational axis 12 is also conceivable. In addition to the aforementioned embodiment, a movement, associated with a force effect, into the direction of the rotational axis 12 onto the pressure-sensitive sensor element 23, 32 represents a great, and thus a clear, difference to the "normal operating mode". The machine operator 5 may thus unambiguously distinguish an exceptional situation from the "normal operating mode". The application of force into the direction of the rotational axis 12 may in a limit case even be carried out by a punch onto the rotating wheel 10 by the machine operator 5. This allows for a short reaction time of the machine operator 5, which involves an increase of the safety during operation. Preferably, a pressure-sensitive sensor element is arranged on the front side of the gripping region 29 for example as an additional, fourth sensor element 32.

In an alternative embodiment, the rotating wheel 10 may be mounted on the operating element body 7 movably in the direction of the rotational axis 12 and a switching or sensor element 28 may be formed, which is provided for signaling or triggering a quick stop or emergency stop command depending on the movement of the rotating wheel 10 along its rotational axis 12. The switching or sensor element 28 is shown in FIGS. 3 through 7 and represents a particular embodiment. In this further embodiment, it is advantageous that the command input for an exceptional situation into the controller 3 of the machine 2 is decoupled from the at least two actuation portions 14, 15 on the lateral surface 11. Due to the compact construction of the rotating wheel 10, which merely comprises a common axis of rotation 25, a movement of the rotating wheel 10 along its rotational axis 12 may be carried out by the machine operator 5 very easily. The position of the application of force on the rotating wheel 10 thus plays a minor part for the movement. In a limit case, it may even be carried out by a punch onto the rotating wheel 10 by the machine operator 5 such that a movement into the direction of the rotational axis 12 is induced. The switching or sensor element 28 which is provided for signaling a "quick stop" or "emergency stop command" to the controller 3 of the machine 2 may be integrated in the operating element 4/operating element body 7 in a very easy and robust manner. This represents a cost-effective and very safe construction. It may also be provided for that the rotating wheel 10 is locked in its position after the movement along the rotational axis 12. A rotation movement of the rotating wheel 10 or a command input by moving the hand 6/the fingers of the machine operator 5 is thereby blocked. In this case, unlocking the rotating wheel 10 may only take place after an acknowledgment of the quick stop or emergency stop command.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The objects underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| | List of reference numbers |
|---|---|
| 1 | manufacturing plant |
| 2 | machine |
| 3 | controller |
| 4 | operating element |
| 5 | machine operator |
| 6 | hand |
| 7 | operating element body |
| 8 | display |
| 9 | push button |
| 10 | rotating wheel |
| 11 | lateral surface |
| 12 | rotational axis |
| 13 | local diameter mean value |
| 14 | first actuation portion |
| 15 | second actuation portion |
| 16 | third actuation portion |
| 17 | surface structure |
| 18 | first sensor region |
| 19 | second sensor region |
| 20 | third sensor region |
| 21 | first sensor element |
| 22 | second sensor element |
| 23 | third sensor element |
| 24 | circumferential direction |
| 25 | axis of rotation |
| 26 | elevation |
| 27 | recess |
| 28 | switching or sensor element |
| 29 | gripping region |
| 30 | front side |
| 31 | additional/fourth sensor region |
| 32 | additional/fourth sensor element |

The invention claimed is:

1. An operating element (4) for an electrically controlled machine (2), having an operating element body (7) and a rotating wheel (10) for inputting a command into a controller (3) of the machine (2), wherein the rotating wheel (10) is arranged on the operating element body (7) in a rotatable manner about a rotational axis (12) and is surrounded by a lateral surface (11) that has local diameter mean value (13)

specified in the perpendicular direction to the rotational axis (12), on which lateral surface (11) the rotating wheel (10) may be gripped and rotated by a machine operator (5), and wherein the lateral surface (11) of the rotating wheel (10) has at least two actuation portions (14, 15) with different surface structures (17), wherein a sensor region (18, 19) of a sensor element (21, 22) is associated with at least one of the actuation portions (14, 15), and wherein different machine functions for inputting at least one command into the controller (3) are associated with at least one of the actuation portions (14, 15), wherein the at least two actuation portions (14, 15) with different surface structures (17) are arranged on the lateral surface (11) of the rotating wheel (10) in such a way that the machine operator (5) may grip them with a hand (6) and/or fingers of the hand for inputting a command into the controller (3) in normal operating mode by axial movement, and wherein at least one actuation portion (14, 15) on a front side comprises a pressure-sensitive sensor element (22, 32) for inputting a stop command, the pressure-sensitive sensor element (22, 32) being arranged such that its sensor region (19, 31) is essentially directed towards the rotational axis (12).

2. The operating element (4) according to claim 1, wherein the actuation portions (14, 15) having at least two different surface structures (17) are arranged at a distance from one another in the direction of the rotational axis (12) and are entirely formed on the lateral surface (11) in the circumferential direction (24) of the respective sensor region (18).

3. The operating element (4) according to claim 1, wherein the at least two actuation portions (14, 15) of the rotating wheel (10) are mounted rotatably about a common axis of rotation (25) relative to the operating element body (7).

4. The operating element (4) according to claim 1, wherein the rotating wheel (10) is formed rotationally symmetrical, in particular cylindrical, in its basic contour and the local diameter mean value (13) of the lateral surface (11) amounts to between 20mm and 80mm, in particular between 35mm and 60mm, preferably between 40mm and 50mm.

5. The operating element (4) according to claim 4, wherein at least one of the actuation portions (14, 15) has different, in particular continuously and/or discontinuously increasing and/or decreasing local diameter mean values (13) of the lateral surface (11) along the rotational axis (12).

6. The operating element (4) according to claim 1, wherein the surface structure (17) of at least one of the actuation portions (14, 15) comprises round and/or longitudinally extended elevations (26), such as bridges, knobs, pyramids, and/or recesses (27), such as rills, grooves, dents, honeycombs, dimples, small pits, in relation to the local diameter mean value (13) of the lateral surface (11).

7. The operating element (4) according to claim 6, wherein the longitudinally extended elevations (26) and/or recesses (27) have a proportion of a larger extension to a shorter extension of the elevations (26), or the recesses (27) respectively, on the lateral surface (11) of larger than 1.5, preferably larger than 5.

8. The operating element (4) according to claim 6, wherein the surface structure (17) of at least one of the actuation portions (14, 15) has a proportion of the deviation of the highest elevation (26) and/or lowest recess (27) of the lateral surface (11) in perpendicular direction to the rotational axis (12) to the local diameter mean value (13) of larger than 0.001, preferably 0.005, more preferably of larger than 0.01.

9. The operating element (4) according to claim 1, wherein the surface structure (17) of at least one of the actuation portions (14, 15) is formed evenly across the lateral surface (11) of the respective actuation portion (14, 15).

10. The operating element (4) according to claim 1, wherein the surface structure (17) of at least one of the actuation portions (14, 15) is formed symmetrically in at least one direction, preferably in the circumferential direction (24), across the lateral surface (11) of the respective actuation portion (14, 15).

11. The operating element (4) according to claim 1, wherein the surface structure (17) of at least one of the actuation portions (14, 15) is formed irregularly across the lateral surface (11) of the respective actuation portion (14, 15).

12. The operating element (4) according to claim 1, wherein the lateral surface (11) of at least one of the actuation portions (14, 15) comprises predominantly metal.

13. The operating element (4) according to claim 1, wherein the surface structure (17) of at least one of the actuation portions (14, 15) at least partially comprises a second material, preferably a plastic material.

14. The operating element (4) according to claim 1, wherein a first, second and/or additional actuation portion (14, 15, 16, 29) is respectively associated with a machine function selected from the group working feed, spindle speed, no-load feed, axial infeed, radial infeed, tool change.

15. A method for inputting a command into the controller (3) of the electrically controlled machine (2) using an operating element body (7) and a rotating wheel (10) that is arranged on the operating element body (7) in a rotatable manner about a rotational axis (12), the rotating wheel (10) being surrounded by a lateral surface (11) that has local diameter mean value (13) specified in the perpendicular direction to the rotational axis (12), on which lateral surface (11) the rotating wheel (10) may be gripped and rotated by a machine operator (5), and wherein the lateral surface (11) of the rotating wheel (10) has at least two actuation portions (14, 15) with different surface structures (17), wherein a sensor region (18, 19) of a sensor element (21, 22) is associated with at least one of the actuation portions (14, 15), and wherein different machine functions for inputting at least one command into the controller (3) are associated with at least one of the actuation portions (14, 15), and wherein the at least two actuation portions (14, 15) are arranged on the lateral surface (11) of the rotating wheel (10) in such a way that the machine operator (5) may grip them with a hand (6) and/or fingers of the hand for inputting a command into the controller (3) in normal operating mode by axial movement, and wherein at least one actuation portion (14, 15) on a front side comprises a pressure-sensitive sensor element (22, 32) for inputting a stop command, the pressure-sensitive sensor element (22, 32) being arranged such that its sensor region (19, 31) is essentially directed towards the rotational axis (12), comprising the method steps:
  gripping the rotating wheel (10) of the operating element (4) in at least one of the actuation portions (14, 15) by means of the hand (6) of a machine operator (5);
  selection of parameters by turning the rotating wheel (10) of the operating element (4) about its rotational axis (12);
  inputting commands into the controller (3) of the machine (2) by axial movement of the hand (6) of the machine operator (5) in relation to the rotating wheel (10), such that the hand (6) of the machine operator (5) slides from one of the sensor regions (18, 19) into another sensor region (18, 19) and is detected by the respectively concerned sensor element (21, 22) and the command is thereby input;
optional inputting of a stop command by actuating the pressure-sensitive sensor element (32) by exertion of a force in case of a state of exception.

\* \* \* \* \*